Nov. 27, 1923.
A. WOHL
PROCESS FOR THE MANUFACTURE OF YEAST
Filed Aug. 31, 1921
1,475,215
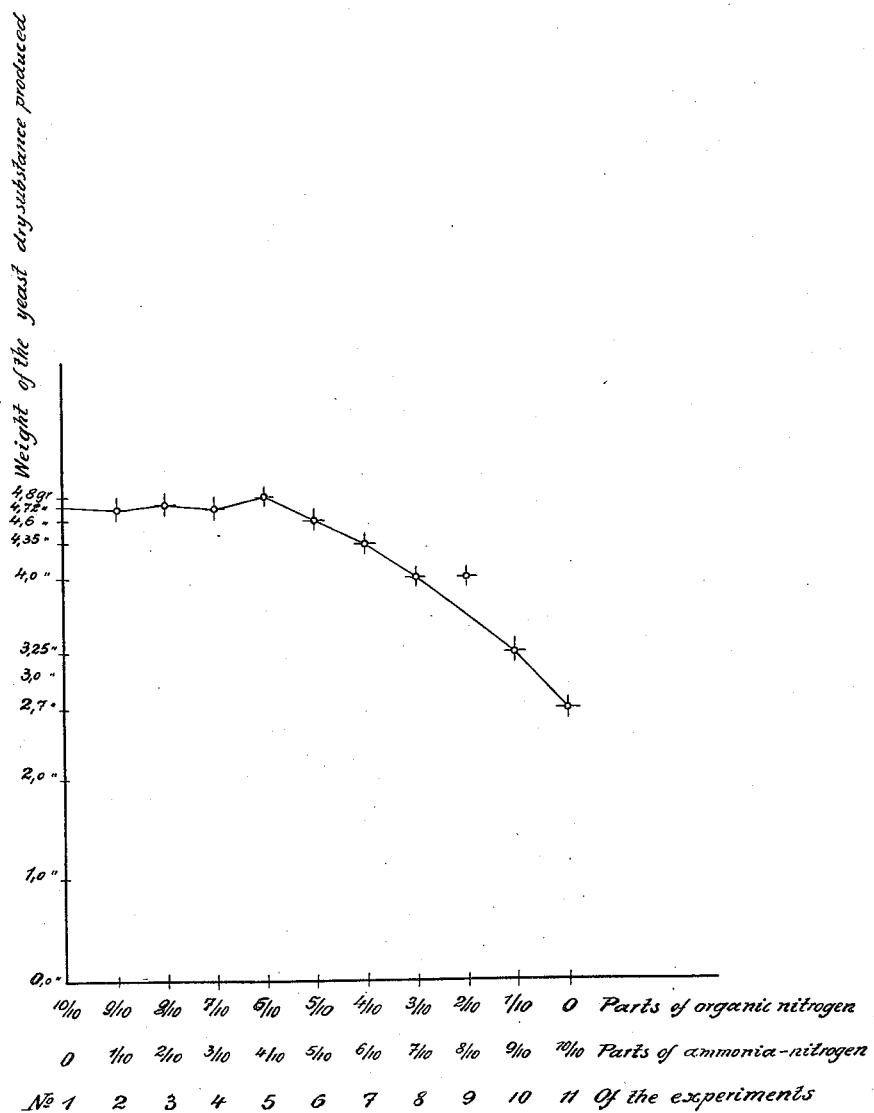
INVENTOR
Alfred Wohl
BY E. T. Ragan
ATTORNEY Patented Nov. 27, 1923.

1,475,215

UNITED STATES PATENT OFFICE.

ALFRED WOHL, OF DANZIG-LANGFUHR, FREE CITY OF DANZIG, ASSIGNOR TO THE FLEISCHMANN COMPANY, OF NEW YORK, N. Y., A CORPORATION OF OHIO.

PROCESS FOR THE MANUFACTURE OF YEAST.

Continuation of applications filed June 23, 1920, Serial No. 391,156, and August 31, 1921, Serial No. 497,322. This application filed August 31, 1921. Serial No. 497,321.

(GRANTED UNDER THE PROVISIONS OF THE ACT OF MARCH 3, 1921, 41 STAT. L., 1313.)

*To all whom it may concern:*

Be it known that I, ALFRED WOHL, residing at Danzig-Langfuhr, Free City of Danzig, have invented certain new and useful Improvements in the Process for the Manufacture of Yeast (for which application for patent were filed as follows: France, filed June 11, 1920; Denmark, filed June 11, 1920; United States of America, filed June 23, 1920; Czechoslovakia, filed June 25, 1920; Canada, filed June 10, 1920; Spain, filed July 14, 1920; Rumania, filed August 6, 1920; Germany, filed January 15, 1915, Patent 310580; Sweden, filed December 29, 1919; Poland, filed June 7, 1920), of which the following is a specification.

This invention relates to the production of yeast and more particularly to the production of yeast in a nutrient wort which is made from cereal material in the usual proportions except that the amount of organic nitrogen usually used is materially reduced, and the missing yeast-assimilable nitrogen is replaced by an inorganic compound containing yeast-assimilable nitrogen.

An object of this invention is the production of compressed yeast by a process which is adapted to be easily carried out, producing a large yield of yeast and materially lowering the cost of production of the yeast as compared with that produced in the usual cereal wort process.

Another object of the invention is the production of yeast from a nutrient solution containing essentially sacchariferous material and other yeast nutrients including cereal material and inorganic nitrogen containing compounds adapted to be at least partially assimilated by the yeast and during such assimilation to set free components which tend increasingly to acidify the nutrient solution, the yeast-assimilable organic nitrogen contained in the cereal material being present to an appreciably lesser degree than in a usual cereal wort, and the missing yeast assimilable nitrogen being added in the form of inorganic compounds. The propagation is carried on with aeration, and at least a substantial portion of the released acidity is neutralized at the election of the operator, the yeast obtained from this wort, either with or without neutralization, being capable of yielding sturdy successive generations indefinitely in continuous operation, that is, without revivification.

Other objects will be in part obvious and in part pointed out hereinafter.

The invention accordingly consists in the several steps and the relation and order of one or more such steps with relation to each of the others thereof, which will be exemplified in the hereinafter disclosed process and the scope of the application of which will be indicated in the claims that follow.

The nitrogenous substances which are used for nutrition in the growth of yeast can emanate from very different sources. Generally, amino nitrogen is considered the most favorable for fermentation and for the increase of the yeast. In the practical manufacture of aerated yeast, malt sprouts are generally used in addition to malt as a source of nitrogenous food. The indefinitely continued commercial production of yeast of fully satisfactory quality in successive generations without revivifications, with inorganic salts of ammonia as the sole nitrogen source is not possible. Experiments show that the yield and fermentative power fall with exceeding rapidity to values which are of no use in practice as soon as the excess of organically bound nitrogen contained in the seed yeast is expended.

The process hereinafter described is based on the new and unexpected observation that a partial substitution of yeast-assimilable organic nitrogen by the cheaper inorganic ammonium salts, up to the extent indeed of nearly one-half, has practically no influence on the yield of yeast and the fermentative power of the yeast produced. Beyond this limit a noticeable reduction, which grows larger in proportion as the organic nitrogen decreases, takes place in the yield of yeast, as is shown by the accompanying curve representing the results of experiments, this being especially true unless at least a substantial portion of the acidity, which results from a partial assimilation of the inorganic ammonium salts and the consequent release of components from such salts which tend to produce an increasing acidity, be neutralized.

We are here dealing with an effect in which the organic nitrogen compounds and the ammonium salts mutually contribute to the nutrition of the yeast. For example, if in an experiment the ammonium salts are omitted, then under otherwise similar conditions instead of 4.6, only 2.99 grams of dry substance will be obtained, in the shape of newly formed yeast, per 1 litre of 2½% sugar solution.

In the experiments shown in the curve à total concentration of nitrogen was used sufficient for a maximum yield by weight, but not sufficient to keep the newly produced yeast up to the nitrogen content of the seed yeast, for in that case the total quantity would as in actual practice, have to be increased about 2½ to 3 times. Then again it is found however that a mixture in the proportion of 40 to 50% of the total yeast-assimilable nitrogen in the form of ammonium salts is entirely sufficient to allow of breeding six or more generations of yeast in succession without the yield or proportion of nitrogen falling off more rapidly than would be the case in actual practice where the same content of nitrogen is offered by malt sprouts and malt. Indeed according to the present invention the germinating power is even better preserved than under known working conditions.

With a view to improving the properties of the yeast, it is found useful to supply the ammonium salts in two or more stages. This does not influence the yield, but imparts a better compressibility to the yeast.

From the summary of the literature by Pringsheim published in the Wochenschrift f. Brauerei 1907, page 126, it is known that, qualitatively, yeast can take up nitrogen as a food in the form of ammonia both from solutions containing ammoniacal nitrogen (Bokorny) and from solutions containing ammoniacal nitrogen mixed with asparagin (Petit,) but it is also known that with ammoniacal nitrogen alone, it can not be so fed that it remains practically useable. This is also confirmed by our experiments. The summary of literature also sets forth that ammoniacal nitrogen is taken up by yeast in the same manner as is asparagin nitrogen (Petit,) the former, at the optimum temperature, even to a large extent (Laborde.) but that the yield of yeast in these nutrients drops from peptone to asparagin (Kusserow) and to ammonium sulphate (Bokorny). This latter observation is also confirmed by our experiments and precludes a direct practical utilization of all these data for the feeding of yeast.

French Patent No. 343,133, which relates to improvements in the course of fermentation, not to the production of yeast, is based upon the use of extract of yeast as nitrogenous food. Apart from this it recommends an addition of inorganic mineral salts ($SO_3$, $P_2O_5$, $CaO$, $MgO$). Among other phosphates such as potassium phosphate there is mentioned phosphate of ammonia. This equivalency to potassium phosphate as well as the indefinite amounts prescribed, prove that the ammonium salt is here only mentioned as a well-known kind of phosphoric acid food. The same applies to British patent specification No. 21,011/1896 and to the publication concerning the same matter in the Wochenschrift f. Brauerei 1898, p. 237, from which it can be seen that as an origin of nitrogen, maltopeptone is used, and in this only 6% of the nitrogen is present as ammoniacal nitrogen.

It has also been shown that ammonia salts increase the nitrogenous contents and the germinating power of yeast. (see Zeitschrift für Spiritus-Industrie 1910, supplement to No. 11, page 3, col. 1, observations 4 and 5,) but the adding of ammonia salts hitherto has been done in comparatively small quantities only, and it was not realized that it would be possible to work with an exceedingly low concentration of organic nitrogenous substances as compared to the concentration of carbohydrates.

The statement in the Jahrbuch des Vereins der Spiritus-Fabrikanten in Deutschland, second year, (1911 p. 23, paragraph 1) that ammonium salts are utilized by yeast in large quantities for building up its body substance, contains nothing about the conditions under which this is possible in order to have the most favorable yield with reference to the total nitrogen used. From a closer description of experiments in this relation, it is found that in the reaction filter the assimilation of nitrogen by yeast from a sugar solution containing ammonium sulphate, drops from roughly 30% to roughly 7% (Jahrbuch des Vereins der Spiritus-Fabrikanten in Deutschland, 1912, page 37, paragraph 2). Further results of these works are also recorded in the same Jahrbuch, 1913, at the bottom of page 33 and the top of page 34 where the following summary of results achieved are summarized as follows:

1. That ammonium salts cannot even remotely be regarded as complete nitrogen food for yeast.

2. That on the contrary a mixture of amino acids such as is obtained, for instance, from autodigestion of yeast, ensures full nutrition and probably a better nutrition than the albumen, albumose, and peptone feeding such as is presented by use of malt liquor (wort.)

Neither the more favorable utilization of the nitrogen, which is obtained in a suitably proportioned mixture of organic nitrogen and ammonia nitrogen, the longer inheritance of the good properties of the yeast produced under these conditions, nor yet the good keeping quality and the influence on pressing qualities of yeast which is produced by the gradual addition of ammonium salts, have hitherto been recognized. All these points, however, are of importance in the practical application of the hereinafter described process of the manufacture of yeast, with aeration, capable of yielding sturdy successive generations indefinitely without revivification and are in striking contrast to experiments which have been carried out in the past and the object of which was only to enrich the wash with albuminous substances and in which no consideration was taken of the properties of yeast which are highly desirable in the commercial compressed yeast manufacturing industry.

Moreover it might be presumed that, with the ordinary organic nitrogenous food, if a comparatively small quantity of ammoniacal nitrogen were supplied in addition, the properties of the yeast would not be altered to any appreciable extent and perhaps also that a quantitatively inconsiderable substitution would not have any effect on the yield of yeast. On the other hand the perception of the fact which is of importance from the point of view of the practical invention, that a substitution of organic nitrogen by ammoniacal nitrogen is possible to so large an extent that a practical advantage results without impairment of the properties of the yeast, its fermenting powers, further propagating powers, or its yield, and that such substitution, has a favorable influence of these properties, is a new discovery.

Although in Example I, which appears hereinafter, an example of that what I have termed a "usual cereal wort" is set forth, it is to be understood that, since the various components of different cereal materials vary within quite wide limits, the formula given is merely an example and may be correspondingly varied in the manner well known to yeast manufacturers. It is pointed out, however, that although the green malt contains a certain percentage of yeast-assimilable organic nitrogen, the malt sprouts contain by far the larger part of the yeast-assimilable organic nitrogen and that, therefore, if in any cereal wort containing approximately the usual amount of yeast-assimilable organic nitrogen supplying materials, a considerable portion thereof be omitted and ammonium salts be added to replace the yeast-assimilable organic nitrogen thus omitted, such replacement of yeast-assimilable organic nitrogen by yeast-assimilable inorganic nitrogen would fall within my disclosure provided that the replacement was more than ten per cent, and did not greatly exceed fifty per cent. The remaining examples, II to V inclusive, show typical compositions of various worts in which varying percentages of yeast-assimilable organic nitrogen have been replaced by yeast-assimilable inorganic nitrogen.

Furthermore, although in Example I the use of no neutralizing agent has been suggested, for the reason that I have found it possible to attain desirable results without the use of such neutralizing agent, however, if as is shown in Example II, not only is a material portion of the organic nitrogen contained in the malt sprouts omitted, but also a considerable portion of the cereals containing saccharifiable matter is omitted, at least a part of the sugars so omitted being replaced by the addition of sugar, I have found it desirable to neutralize at least a substantial portion of the acidity formed in the solution as a result of the partial assimilation of the ammonium salts by the yeast, by incorporating with the wort a relatively insoluble innocuous antacid carbonate or a mixture of such carbonates, such as calcium or magnesium carbonates, adapted progressively to neutralize the released acidity. Although no such addition of a neutralizing agent has been shown in Example I, yet, as has been pointed out above, even though it is not necessary, such may be added at the election of the operator and is therefore comprehended within my invention.

The systematic experiments which had led to these discoveries have been based upon the principle of ascertaining whether a practically useful yeast, in a yield which is commercially practicable could be obtained with a mixed food when it is known that such a yeast and such yields could not be obtained by a process wherein the nitrogenous food is supplied only in the form of ammoniacal salts. That this could be done to practical advantage was the unforeseen result applying to the special case of the production of yeast by the aeration process.

As illustrative of the method of carrying out my invention the following examples are given:

I. In a usual mash composed of 40% malt sprouts, 20% green malt and 40% maize comprising a total mash of 100 hundredweights only 10 hundred-weights of malt sprouts are used and the nitrogen which is usually supplied by the other 30% of malt sprouts is supplied in the form of ammoniacal salts, for example, 150 kilograms of ammonium sulphate or a corresponding amount of ammonium phosphate $(NH_4)_2HPO_4$, ammonium nitrate or other ammonium salt or mixture of salts. The cereals are mashed in the usual manner and the resulting wort is seeded with eight per cent of seed yeast and aerated for about 10 hours, the ammonium salts being gradually added during the propagating period. After the propagation is completed, the yeast is separated and packed in suitable manner.

II. A mash of 90 kilograms of cane sugar and 45 kilograms of germinated malt is mashed and the resultant wort is seeded with 15 to 20 kilograms of seed yeast, there being gradually added 9 kilograms of ammonium sulphate, 1½ kilograms of superphosphate and 2½ kilograms each of calcium carbonate and magnesium carbonate. The yield after deducting the seed yeast is 65 kilograms yeast with 54% albumen in the dry substance and 30 litres of spirit. This is 48.1% yeast and 22.2% spirit, totalling 70.3% relatively to the cane sugar; or 34.4% yeast and 18.2% spirit, totalling 57.6% as referred to the grain used.

III. A mash of 90 kilograms of cane sugar, 25 kilograms of germinated malt, 2½ kilograms of ammonium sulphate, 0.2 kilograms of magnesium sulphate and 2½ kilograms of calcium carbonate is treated as above and from the same, after deducting the seed yeast, there is obtained 39 kilograms of yeast and 40 litres of spirit. This makes 33.9% yeast and 34.8% spirit, totalling 68.7% relatively to the cane sugar; or 26.8% yeast and 27.6% spirit, totalling 54.4% referred to the grain used.

IV. A mash of 900 kilograms of green malt, 500 kilograms of germinated malt and 3200 kilograms of cane sugar (combined mash of a weight of 5140 kilograms) is started with 400 kilograms of yeast, with a gradual addition of 60 kilograms of ammonium sulphate and 60 kilograms of calcium carbonate, and are aerated in the usual way. There is obtained net 1740 kilograms of good and well pressable yeast and 1620 litres of spirit. This makes 40.5% of yeast and 37.6% of spirit, totalling 78.1% relatively to cane sugar; 33.8% yeast and 31.5% spirit, totalling 65.3% relatively to the grain used. According to Examples (III) and (IV), one and the same yeast was carried forward for months in a distillery.

V. In a further working experiment according to Example IV, but without the addition of ammonium sulphate and with addition of 400 kilograms of dry spent grain, there was obtained a net yield of 1410 kilograms yeast and 1620 litres of spirit. This makes 32.7% yeast and 37.6% spirit, totalling 70.3% relatively to cane sugar; or 27.4% yeast and 31.5% spirit, totalling 58.9% relatively to the grain used. The spent grain added for filtering has not been taken into account at all in calculating the yield relative to the grain used otherwise the difference would be a little greater still.

Example IV cannot be directly compared with Examples II and III because in the Example IV green malt also is used and this supplies nitrogen in a form which is readily assimilated by yeast.

As certain changes could be made in carrying out the above process without departing from the scope of the invention, it is intended that all matter contained in the above description shall be interpreted as illustrative and not in a limiting sense.

This case is a continuation of my co-pending application, Serial No. 391,156 filed June 23, 1920, and a continuation of and a consolidation with my co-pending application, Serial No. 497,322 filed August 31, 1921.

Having described my invention, what I claim as new and desire to secure by Letters Patent, is:

1. The process of manufacturing yeast which comprises preparing a cereal wort in which the yeast-assimilable organic nitrogen is replaced to an amount of from 10% to 50% by yeast-assimilable ammoniacal nitrogen, and propagating yeast therein with aeration.

2. The process of manufacturing yeast which comprises preparing a cereal wort including an amount of yeast-assimilable organic nitrogen which is less, by from 10% to 50%, than the amount normally present in a usual cereal wort, supplying the deficiency of yeast-assimilable organic nitrogen by adding inorganic salts containing yeast-assimilable nitrogen, and propagating yeast therein with aeration.

3. The process of manufacturing yeast which comprises preparing a cereal wort including an amount of yeast-assimilable organic nitrogen which is less, by from 10% to 50%, than the amount normally present in a usual cereal wort, propagating yeast therein with aeration, and during the process of propagation supplying the deficiency of yeast-assimilable nitrogen by the fractional addition of an inorganic compound containing yeast-assimilable nitrogen.

4. The process of manufacturing yeast which comprises preparing a yeast nutrient solution, containing essentially sacchariferous material and other yeast nutrients, including cereal material and an inorganic compound containing yeast-assimilable nitrogen substituted for organic nitrogen normally present in a usual cereal wort to an extent whereby the yeast is capable of yielding sturdy successive generations indefinitely in continued operation, and propagating yeast therein with aeration.

5. The process of manufacturing yeast capable of yielding sturdy successive generations indefinitely in continued operation, which comprises preparing a yeast nutrient solution, containing essentially sacchariferous material and other yeast nutrients, including cereal material present only in such amounts as will cause the yeast nutrient solution to contain from 10% to 50% less than the amounts of yeast-assimilable organic nitrogen normally present in a usual cereal wort and including an inorganic compound containing yeast-assimilable nitrogen in amounts sufficient to supply the deficiency of yeast-assimilable nitrogen, and propagating yeast therein with aeration.

6. The process of manufacturing yeast capable of yielding sturdy successive generations indefinitely in continued operation, which comprises preparing a yeast nutrient solution containing essentially sacchariferous material and other yeast nutrients, including cereal material present only in such amounts as will cause the yeast nutrient solution to contain from 10% to 50% less than the amounts of yeast-assimilable organic nitrogen normally present in a usual cereal wort, propagating yeast therein with aeration, and during the process of propagation supplying the deficiency of yeast-assimilable nitrogen by the fractional addition of inorganic compounds containing yeast-assimilable nitrogen.

7. The process of manufacturing yeast which comprises preparing a cereal wort in which the yeast-assimilable organic nitrogen is replaced to an amount from 10% to 50% by yeast-assimilable ammoniacal nitrogen containing compounds from which components are liberated which tend increasingly to acidify the wort during propagation, adding to the wort sufficient amounts of a relatively insoluble innocuous antacid carbonate to neutralize at least a substantial portion of such acidity, and propagating yeast therein with aeration.

8. The process of manufacturing yeast which comprises preparing a cereal wort including an amount of yeast-assimilable organic nitrogen which is less by from 10% to 50% than the amount normally present in a usual cereal wort, supplying the deficiency of yeast-assimilable nitrogen by adding inorganic salts containing yeast-assimilable nitrogen and from which components are liberated which tend increasingly to acidify the wort during propagation, adding to the wort sufficient amounts of a relatively insoluble innocuous antacid carbonate to neutralize at least a substantial portion of such acidity, and propagating yeast therein with aeration.

9. The process of manufacturing yeast capable of yielding sturdy successive generations indefinitely in continued operation, which comprises preparing a yeast nutrient solution containing essentially sacchariferous material and other yeast nutrients, including cereal material present only in such amounts as will cause the yeast nutrient solution to contain from 10% to 50% less than the amounts of yeast-assimilable organic nitrogen normally present in a usual cereal wort and including an inorganic compound containing yeast-assimilable nitrogen in amounts sufficient to supply the deficiency of yeast-assimilable nitrogen and from which components are liberated which tend increasingly to acidify the wort during propagation, adding to the wort sufficient amounts of a relatively insoluble innocuous antacid carbonate to neutralize at least a substantial portion of such acidity, and propagating yeast therein with aeration.

10. The process of manufacturing yeast capable of yielding sturdy successive generations indefinitely in continued operation which comprises preparing a yeast nutrient solution containing essentially sacchariferous material and other yeast nutrients, including cereal material present only in such amounts as will cause the yeast nutrient solution to contain from 10% to 50% less than the amounts of yeast-assimilable organic nitrogen normally present in a usual cereal wort, adding to the wort a relatively insoluble innocuous antacid carbonate, propagating therein yeast with aeration, and during the process of propagation supplying the deficiency of yeast-assimilable nitrogen by the fractional addition of an inorganic compound containing yeast-assimilable nitrogen, said insoluble innocuous antacid carbonate being present in amounts sufficient to neutralize at least a substantial portion of such acidity.

In testimony whereof I affix my signature in presence of two witnesses.

ALFRED WOHL.

Witnesses:
HOWARD A. BOWMAN,
WILLIAM M. ROBERTSON.